US010708158B2

(12) United States Patent
Brown (10) Patent No.: US 10,708,158 B2
(45) Date of Patent: Jul. 7, 2020

(54) NETWORK ADDRESS OF A COMPUTING DEVICE

(71) Applicant: Hewlett Packard Enterprise Development LP, Houston, TX (US)

(72) Inventor: Andy Brown, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 364 days.

(21) Appl. No.: 15/327,684

(22) PCT Filed: Apr. 10, 2015

(86) PCT No.: PCT/US2015/025465
§ 371 (c)(1),
(2) Date: Jan. 20, 2017

(87) PCT Pub. No.: WO2016/164052
PCT Pub. Date: Oct. 13, 2016

(65) Prior Publication Data
US 2017/0214590 A1 Jul. 27, 2017

(51) Int. Cl.
*G06F 15/173* (2006.01)
*H04L 12/26* (2006.01)
*H04L 29/12* (2006.01)
*H04L 12/24* (2006.01)
(Continued)

(52) U.S. Cl.
CPC .......... *H04L 43/08* (2013.01); *H04L 41/0803* (2013.01); *H04L 43/0817* (2013.01); *H04L 61/2015* (2013.01); *H04L 69/22* (2013.01); *H04L 61/6059* (2013.01); *H04L 67/125* (2013.01)

(58) Field of Classification Search
CPC .......... H04L 43/08; H04L 29/06; H04L 29/12
USPC ....................................................... 709/224
See application file for complete search history.

(56) References Cited

U.S. PATENT DOCUMENTS 6,137,804 A * 10/2000 Allison .................. H04L 49/90
370/410
6,581,168 B1 6/2003 Goh
6,731,596 B1 5/2004 Chiang
(Continued)

FOREIGN PATENT DOCUMENTS

CN 202488476 U 10/2012
TW 201304455 A1 1/2013

OTHER PUBLICATIONS

Gordon Jahn, "Using the Fast Ethernet Controller on the Qorivva MPC564xB/C," Dec. 2012, 25 Pgs., <http://cache.freescale.com/files/32bit/doc/app_note/AN4577.pdf>.
(Continued)

*Primary Examiner* — Anthony Mejia
(74) *Attorney, Agent, or Firm* — Hewlett Packard Enterprise Patent Department (57) ABSTRACT

Examples disclosed herein relate, in one aspect, to a computing device. The computing device may include, among other things, a first communications module to send communication data, a communications monitor to capture a portion of the communication data sent from the first communication module, and a management processor to determine, based on the captured portion, a network address associated with the computing device.

19 Claims, 4 Drawing Sheets

(51) Int. Cl.
*H04L 29/06* (2006.01)
*H04L 29/08* (2006.01)

(56) References Cited

U.S. PATENT DOCUMENTS

| | | | | |
|---|---|---|---|---|
| 7,620,056 | B2 * | 11/2009 | Miriyala | H04L 12/5601 370/395.1 |
| 7,646,790 | B2 | 1/2010 | Minami | |
| 7,747,737 | B1 * | 6/2010 | Apte | H04L 43/028 370/230.1 |
| 7,924,863 | B2 * | 4/2011 | Baruch | H04L 49/90 370/421 |
| 8,005,083 | B1 * | 8/2011 | Diep | H04L 12/2801 370/389 |
| 8,144,678 | B1 * | 3/2012 | Breau | H04W 12/0013 370/338 |
| 8,300,594 | B1 | 10/2012 | Bernier | |
| 8,345,673 | B1 * | 1/2013 | Lo | G06F 1/3209 370/366 |
| 8,774,016 | B2 * | 7/2014 | Lu | H04L 12/413 370/249 |
| 8,844,041 | B1 * | 9/2014 | Kienzle | H04L 41/12 709/224 |
| 9,674,090 | B2 * | 6/2017 | Caulfield | H04L 47/12 |
| 10,021,019 | B2 * | 7/2018 | Koponen | H04L 41/0896 |
| 10,284,460 | B1 * | 5/2019 | Bshara | H04L 45/26 |
| 2004/0100952 | A1 * | 5/2004 | Boucher | H04L 29/06 370/389 |
| 2004/0258051 | A1 * | 12/2004 | Lee | H04L 12/4011 370/352 |
| 2006/0056406 | A1 | 3/2006 | Bouchard | |
| 2006/0077995 | A1 | 4/2006 | Lenell | |
| 2006/0182103 | A1 * | 8/2006 | Martini | H04L 63/0428 370/389 |
| 2009/0003379 | A1 * | 1/2009 | Shao | H04N 21/4122 370/466 |
| 2009/0073875 | A1 | 3/2009 | Kashyap | |
| 2010/0322265 | A1 * | 12/2010 | Gopinath | H04L 49/901 370/417 |
| 2011/0082928 | A1 * | 4/2011 | Hasha | H04L 67/1095 709/224 |
| 2012/0063334 | A1 | 3/2012 | Drake | |
| 2013/0272127 | A1 | 10/2013 | Ali | |
| 2013/0272292 | A1 | 10/2013 | Hunter | |
| 2014/0122634 | A1 * | 5/2014 | Conner | G06F 13/4027 709/212 |
| 2014/0173157 | A1 * | 6/2014 | Shaw | G06F 13/385 710/305 |
| 2014/0229630 | A1 * | 8/2014 | Narayanan | H04L 45/38 709/238 |
| 2017/0171145 | A1 * | 6/2017 | Hirai | H04L 61/103 |
| 2018/0331915 | A1 * | 11/2018 | Cave | H04L 12/1831 |

OTHER PUBLICATIONS

International Searching Authority, The International Search Report and the Written Opinion, PCT/US2015/025465, dated Jan. 11, 2016, 12 Pgs.

* cited by examiner

NETWORK ADDRESS OF A COMPUTING DEVICE

BACKGROUND

Many computing devices today are connected to a network. In order to identify a particular computing device on the network, each computing device connected to the network may be assigned one or more network addresses, such as Internet Protocol (IP) addresses. If a first device connected to the network would like to communicate with a second device connected to the network, the first device needs to know the second device's network address. Sometimes, a computing device may include several processors (or several cores of a multi-processor) where one processor is dedicated to managing the computing device and is referred to as the management processor. In some cases, the management processor may be associated with a separate network address and may communicate with other devices on the network through a separate network interface. This may allow remote devices to manage the computing device by configuring it or monitoring its status even when they cannot communicate with the computing device through other means.

BRIEF DESCRIPTION OF THE DRAWINGS

The following detailed description references the drawings, wherein.

DETAILED DESCRIPTION

As mentioned above, in some cases, remote devices may be unable to communicate with a computing device through any means other than by communicating with its management processor. For example, a user of a particular remote device may know the network address associated with the management processor, but not the network address that would allow access to and communication with the other ("main") processors and software (e.g., operating system) running thereon. For example, when a computing device is booted and its operating system is launched, the computing device may automatically exchange communications with a dynamic host configuration protocol (DHCP) server, and the DHCP may assign a new IP address to the computing device. In some cases, a remote device may not know the new IP address of the computing device and may not access the DHCP server to find it out. However, in some cases, the remote device may know the IP address associated with the management processor of the computing device (which may not have changed) and therefore may be able to communicate with the management processor.

Examples disclosed herein describe, among other things, a computing device. The computing device may include, among other things, a first communications module to send communication data to a second communications module, a communications monitor to capture a portion of the communication data sent from the first communication module to the second communications module, and a management processor to determine, based on the captured portion, a network address associated with the computing device, and to communicate the network address to another computing device.

Figure 1:
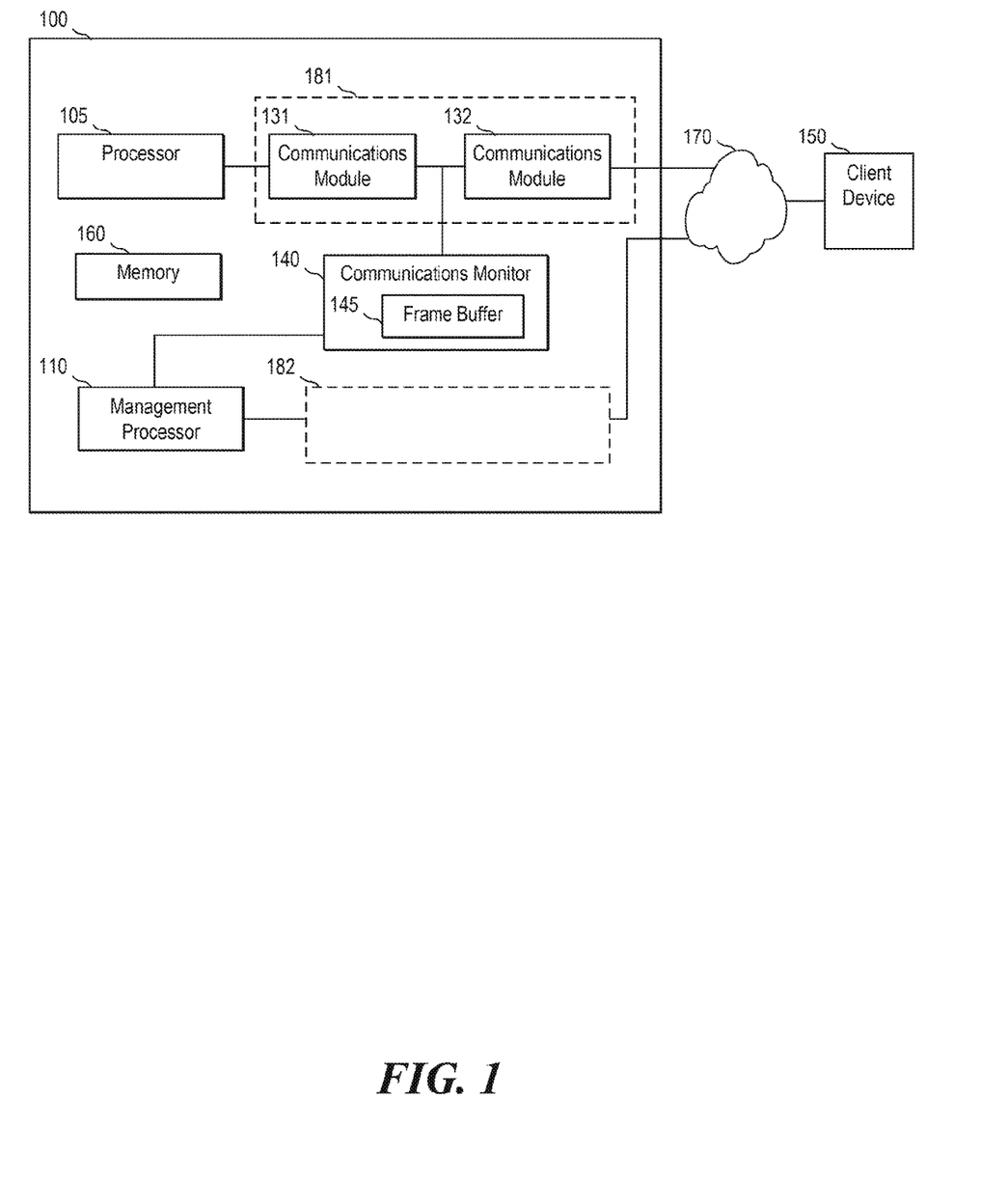
FIG. 1 is a block diagram of an example computing device.

FIG. 1 is a block diagram of an example computing device 100. Computing device 100 may be any type of electronic device or a combination of electronic devices. For example, computing device 100 may be a server, a desktop computer, a notebook computer, a tablet, a mobile phone, a smartphone, a gaming device, a printing device, and the like.

In some examples, computing device 100 may include a processor 105. Processor 105 may include one or more processors, such as central processing units (CPUs) or cores thereof, semiconductor-based microprocessors, hardware state machines, graphics processing units (GPUs), field-programmable gate arrays (FPGAs), or other electronic circuitry, which may be integrated in a single device or distributed across devices. Computing device 100 may also include a memory 160, which may include any combination of volatile and non-volatile memory, such as a random-access memory (RAM), flash memory, hard drive, and so forth. In some examples, memory 160 may include a non-transitory machine-readable storage medium.

In some examples, computing device 100 may communicate through network 170 with other remote devices, such as client device 150. Network 170 may include any combination of local-area networks and wide-area networks (e.g., the Internet), wired or wireless networks, or other types of networks. In some examples, computing device 100 may connect to network 170 via a first network communications interface (NIC) 181, which may include, for example, a first communications module 131 and a second communications module 132. In some examples, modules 131 and 132 may each be implemented as any combination of hardware and programming, and may or may not be located on the same printed circuit board (PCB).

In some examples, modules 131 and 132 may be coupled to each other and communicate with each other via one or more digital or analog signals. For example, modules 131 and 132 may be connected via a media-independent interface (MII) bus and communicate with each other in accordance with the MII standard. Alternatively, modules 131 and 132 may communicate using a reduced MII (RMII) standard, a gigabit MII (GMII), a reduced gigabit MII (RGMII), a serial gigabit MII (SGMII), a quad serial gigabit MII (QSGMII), a ten gigabit MII (XGMII), or any other type of standard that may or may not be related to the MII standard.

In some examples, modules 131 and 132 may operate at different layers of the open systems interconnection (OSI) model. For example, module 131 may operate at layer 2 of the OSI model (the data link layer) or one of its sub-layers, such as the MAC protocol, while module 132 may operate at layer 1 of the OSI model (the physical layer). Accordingly, in some examples, first communications module 131 may include a media access control (MAC) module that may receive communication data (e.g., from processor 105, memory 160, or another module). Module 131 may format the received data in accordance with MAC protocol, and send the formatted data to second communications module 132. Module 131 may also receive communication data formatted in accordance with MAC protocol from second communications module 132, process (e.g., decode) the received data, and provide the processed data to processor 105, to memory 160, or to another module.

Second communications module 132 may, in some examples, include a physical-layer (PHY) module that may receive communication data from first communications module 131. Module 131 may process (e.g., encode, format, etc.) the received communication data in accordance with a physical layer protocol (e.g., Ethernet, Wi-Fi, and the like) and send the communication data to network 170 through a physical medium such as a copper cable, an optical fiber, or air. In addition, module 132 may receive communication data from network 170 through a physical medium, process (e.g., decode, format, etc.) the received data, and send the data to module 131.

In some examples, computing device 100 may also include a management processor 110 through which remote devices such as client device 150 may manage computing device 100. Management processor 110 may include one or more processors, such as central processing units (CPUs) or cores thereof, semiconductor-based microprocessors, hardware state machines, graphics processing units (GPUs), field-programmable gate arrays (FPGAs), or other electronic circuitry, which may be integrated in a single device or distributed across devices. In some examples, management processor 110 may include one or more "lights-out" modules that may be powered on and operational when other modules of computing device 100 (e.g., processor 105) is not powered on or is not operational.

In some examples, remote devices such as client device 150 may communicate with a management application running on management processor 110. Using the management application, remote devices may be able, for example, to install or configure an operating system and/or software applications running on computing device 100 (e.g., on processor 105). Remote devices may also use the management application to retrieve information about the computing device 100 or any of its hardware or software components, or to perform other functions that may or may not be related to management of computing device 100. In some examples, management processor 110 may communicate with remote devices on network 170 via a separate NIC, such as NIC 182, whose details are not shown in FIG. 1 for brevity. In some examples, management processor 110 may communicate with remote devices through other networks or through a direct connection, such as a direct universal serial bus (USB) connection.

As discussed above, in some examples computing device 100 may be associated with one or more network addresses identifying computing device 100 on network 170. Each network address may be, for example, an Internet Protocol (IP) address assigned to computing device 100 by a system administrator, by a dynamic host configuration protocol (DHCP) server, or through other means. As discussed above, computing device 100 may be associated with a first network address, using which remote devices may communicate with processor 105 and its applications, e.g., through NIC 181. In addition, computing device 100 may be associated with a second network address, using which remote devices may communicate with management processor 110, e.g., through NIC 182, in order to manage computing device 100. For purposes of this discussion, and without limitation, the first network address may be referred to as the "main network address" and the second network address may be referred to as the "management network address." As discussed above, in other examples, some remote devices (e.g., a DHCP server) may know the main network address and may be able to communicate with computing device 100 through NIC 181 while other remote devices may not know the main network address and therefore may not be able to communicate with computing device 100 through NIC 181.

In some examples, computing device 100 may include a communications monitor 140. Communications monitor 140 may include one or more processors such as central processing units (CPUs), semiconductor-based microprocessors, hardware state machines, graphics processing units (GPUs), field-programmable gate arrays (FPGAs), programmable array logic (PAL), complex programmable logic devices (CPLDs), or other electronic circuitry, which may be integrated in a single device or distributed across devices. In some examples, communications monitor 140 may be integrated with (e.g., be a part of) management processor 110. In other examples, communications monitor 140 may be a separate module or device communicatively coupled to management processor 110. In some examples, communications monitor 140 may be integrated with (e.g., be a part of) NIC 181. For example, communications monitor 140 may be a part of module 131, a part of module 132, or be a separate module within NIC 181.

In some examples, communications monitor 140 may be able to monitor and capture all or some communications between computing device 100 (e.g. processor 105) and one or more remote devices. For example, communications monitor 140 may monitor and capture communication data transferred to, from, and/or within NIC 181. For example, communications monitor 140 may be able to monitor and capture all or some of communication data being sent from first communication module 131 to second communication module 132, or from module 132 to module 131. In some examples, further illustrated below, communication monitor 140 may be coupled to one or more signals through which modules 131 and 132 exchange communication data. For example, module 131 may have one or more output ports connected both to input ports of module 132 and to input ports of communication monitor 140.

In some examples, communications monitor 140 may capture a portion of the communication data sent from module 131 to module 132. For example, communications monitor 140 may capture a portion of a predefined or variable size upon receiving a capture request from management processor 110, or upon occurrence of another event. After capturing the portion of the communication data, communications monitor 140 may send the captured portion to management processor and/or to store the captured portion in memory 160 or in frame buffer 145. Frame buffer 145 may include any type of volatile and/or non-volatile memory, and may or may not physically reside within communications monitor 140.

In some examples, the captured portion of the communication data may include or correspond to an entire frame (e.g., Ethernet frame), datagram (e.g., IP datagram), packet (e.g., TCP/IP packet), or another type of a predefined segment of communication data. In other examples, the captured portion may include correspond one or more headers of the frame, datagram, packet, etc. For example, the captured portion may include an IP header of an IP datagram. In some examples, communications monitor 140 may be able to detect when a new frame, datagram, or packet is being transmitted from module 131 to module 132 and start capturing the portion when such new frame, datagram, or packet is detected. In some examples, communications monitor 140 may stop capturing the portion after a predefined number of bits (e.g., 256) have been captured, or when communications monitor 140 detects an end of the frame/datagram/packet being transmitted.

After communications monitor 140 captures a portion of the communication data, management processor 110 may obtain the captured portion, either directly from communications monitor 140, or by accessing a memory (e.g., memory 160 or frame buffer 145) where the captured portion has been stored. Communications monitor 140 may then process and analyze the captured portion and determine, based on the captured portion, one or more network addresses included in the captured portion. In some examples, communication data sent from computing device 100 through modules 131 and 132 to remote devices may, as well as communication data received by computing device 100 through modules 132 and 131 from remote devices, may include the main network address. For example, an IP datagram sent from computing device 100 to a remote device (and from module 131 to module 132) may include an IP header that may include the main network address (an IP address) in its "source address" field. Similarly, an IP datagram sent to computing device 100 from a remote device (and from module 132 to module 131) may include an IP header that may include the main network address (an IP address) in its "destination address" field.

In some examples, management processor 140 may analyze the captured portion to determine which format (e.g., IP) it corresponds to, and which version of the format (e.g., IPv4 or IPv6) it corresponds to. Based on these determinations, management processor 140 may determine the position and the size (e.g., 4 bytes or 16 bytes) of the main network address within the captured portion, and use that information to extract the main network address. It is appreciated that in some examples the captured portion may not include the main network address, in which case management processor 140 may ignore the captured portion and request communications monitor 140 to wait for and capture a new portion of communication data.

After determining the network address, management processor 110 may store the network address in a predefined memory location (e.g., in memory 160). Management processor 110 may also provide the network address to a remote device, such as client device 150, through NIC 182 or through other means, as discussed above. For example, management processor 110 may run a management application, and a remote device may access the management application through NIC 182 (using the management network address) and use the management's application user interface to request and receive the main network address. The remote device may then use the main network address to access computing device 100 (e.g., applications running on processor 105) through NIC 181, using the main network address.

In some examples, the main network address may change (e.g., a new network address may be assigned), and/or there may be more than one network address simultaneously associated with computing device 100. In these examples, communications monitor 140 may periodically or upon request by management processor 110 capture a new portion of the communication data. Management processor 110 may then determine a main network address based on the new portion, as discussed above. If the newly determined main network address is different than the previously determined (and stored) main network addresses, management processor 110 may store the new main network address instead or in addition to the previously determined and stored main network addresses. Accordingly, in some examples, a remote device accesses the management processor 110 and receive from management processor 110 a list of main network addresses that may be associated with computing device 100.

Figure 2:
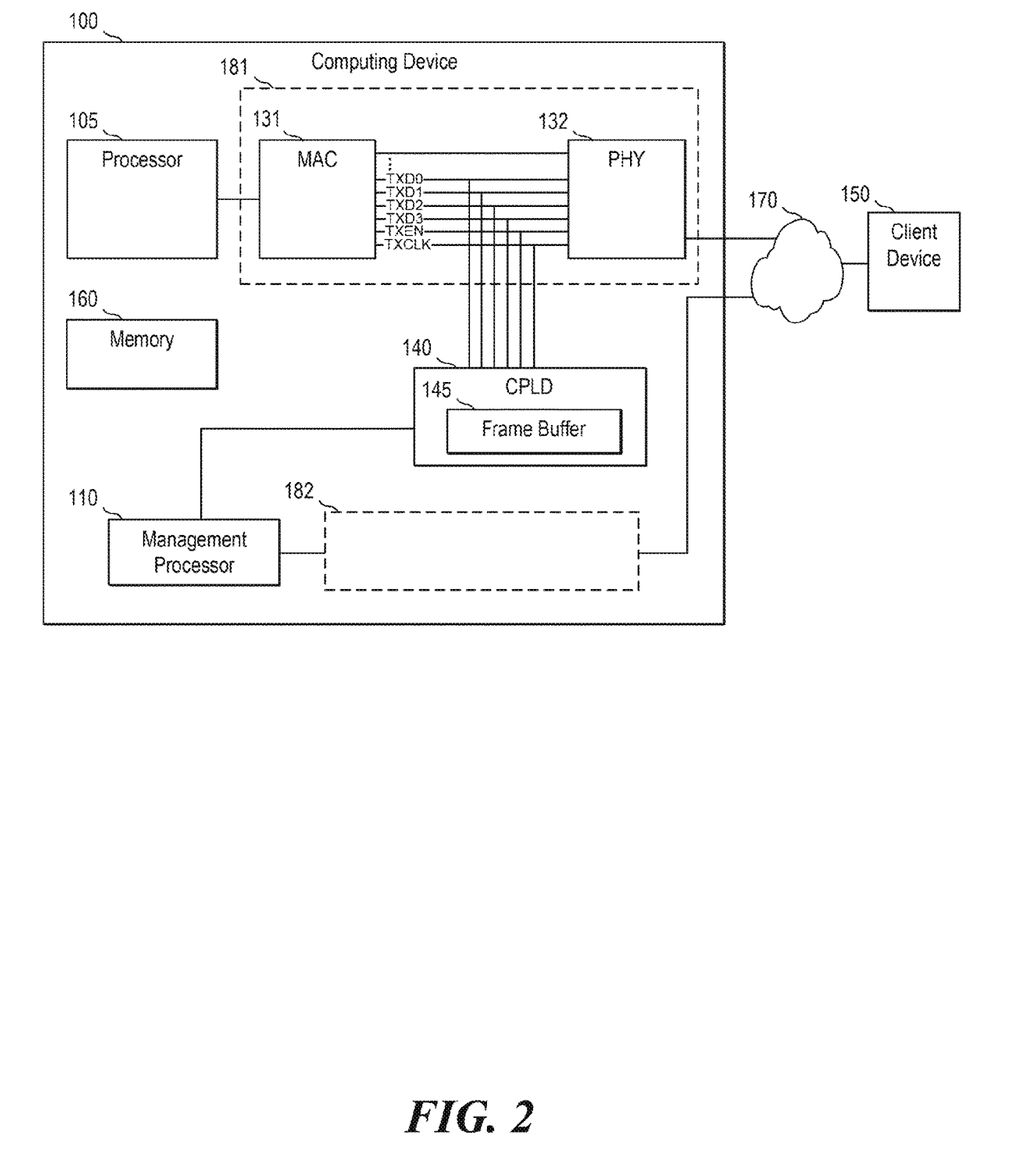
FIG. 2 is a block diagram of another example computing device.

FIG. 2 illustrates another example of computing device 100. In the example of FIG. 2, first communications module 131 is a MAC module, second communications module is a PHY module, and the two modules communicate via MII standard or a related standard. In this example, module 131 sends communication data to module 132 using at least the following signals: TXD0, TXD1, TXD2, TXD3, TXEN, and TXCLK, where signals TXD0-3 represent four bits of frame data, TXCLK represents the clock, and TXEN represents a transmit-enable signal that is asserted active to indicate the start of a new Ethernet frame, and is held active until the frame's transmission is completed.

In the example of FIG. 2, communications monitor 140 is a CPLD device with at least six inputs connected to the six outputs of module 131 discussed above. Thus, in this example, monitor 140 may monitor all communication data sent from module 131 to module 132. Furthermore, monitor 140 may detect the beginning and the end of each Ethernet frame transferred from module 131 to module 132, e.g., by detecting when the TXEN signal is set to '1' and reset to '0', respectively. Accordingly, monitor 140 may be able capture (e.g., upon request from management processor 110) an entire Ethernet frame, or the first N bits of the next Ethernet frame, where N is a predefined and optionally configurable number. Based on the example of FIG. 2, it is appreciated that in some examples communications monitor 140 may be operated at a very high frequency (e.g., 10 GHz, 100 GHz, 1000 GHz, etc.) that is at least the frequency at which communication data is transferred from module 131 to module 132.

It is appreciated that in some examples, instead of or in addition to monitoring, capturing, and analyzing portions of communication data sent by computing device 110 (from module 131 to module 132), the main network address(es) may be determined by monitoring, capturing, and analyzing portions of communication data sent to computing device 110 (from module 132 to module 131), which may also include the main network addresses, e.g., in the "destination address" field of the IP datagram.

As mentioned above, in some examples, some modules of computing device 100, such as processor 105, management processor 110, and communications monitor 140 may be implemented as any combination of hardware and programming. The programming may include processor-executable instructions stored on a tangible, non-transitory computer readable medium and the hardware may include a processing resource for executing those instructions. The processing resource, for example, may include one or multiple processors (e.g., central processing units (CPUs), semiconductor-based microprocessors, graphics processing units (CPUs), field-programmable gate arrays (FPGAs) configured to retrieve and execute instructions, or other electronic circuitry), which may be integrated in a single device or distributed across devices. The computer readable medium can be said to store program instructions that when executed by the processor resource implement the functionality of the respective component. The computer readable medium may be integrated in the same device as the processor resource or it may be separate but accessible to that device and the processor resource. In one example, the program instructions can be part of an installation package that when installed can be executed by the processor resource to implement the corresponding component. In this case, the computer readable medium may be a portable medium such as a CD, DVD, or flash drive or a memory maintained by a server from which the installation package can be downloaded and installed. In another example, the program instructions may be part of an application or applications already installed, and the computer readable medium may include integrated memory such as a hard drive, solid state drive, or the like.

Figure 3:
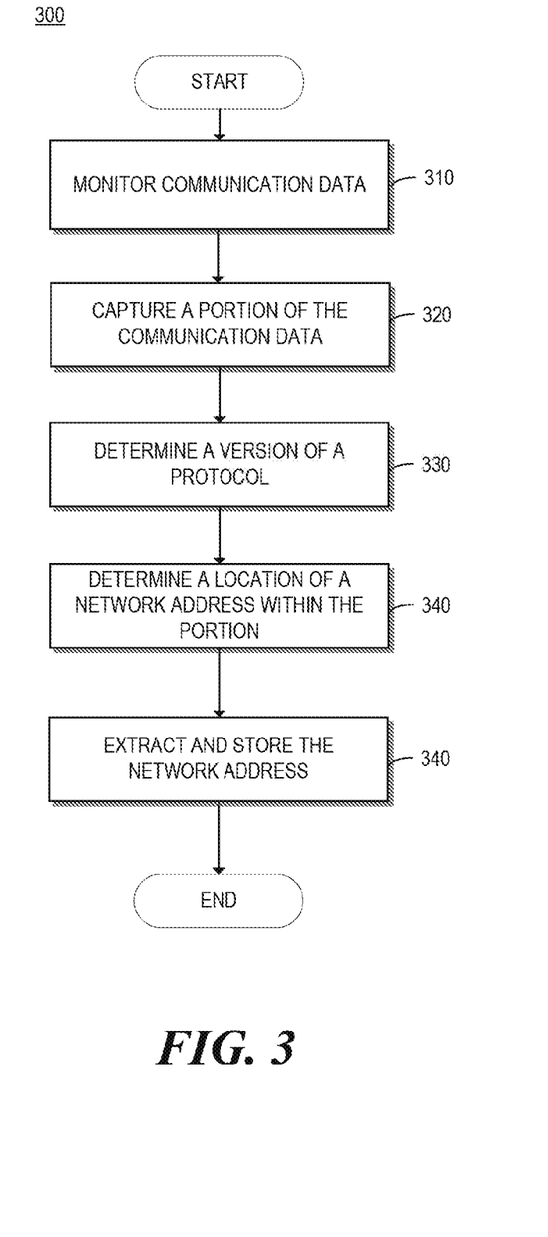
FIG. 3 is a flowchart of an example method.

FIG. 3 is a flowchart of an example method 300 for determining a network address associated with a computing device. Method 300 may be described below as being executed or performed by a computing device a processor (e.g., processor 130), or another suitable device or module. Method 300 may be implemented in the form of executable instructions stored on at least one non-transitory machine-readable storage medium of the computing device and executed by at least one processor of the client device. Alternatively or in addition, method 300 may be implemented in the form of electronic circuitry (e.g., hardware). In alternate examples of the present disclosure, one or more or blocks of method 300 may be executed substantially concurrently or in a different order than shown in FIG. 3. In alternate examples of the present disclosure, method 300 may include more or less blocks than are shown in FIG. 3. In some examples, one or more of the blocks of method 300 may, at certain times, be ongoing and/or may repeat.

At block 310, method 300 may monitor, by a communications monitor, communication data transmitted between two communications modules (e.g., a MAC module and a PHY module) of a computing device. At block 320, the method may capture a portion of the communication data. At block 330, the method may determine, based on the communication data, a version of a protocol associated with the communication data. At block 340, the method may, based on the version, determining a location, within the portion, of a network address associated with the computing device. At block 350, the method may extract the network address from the portion of communications data, and store the network address in a memory of the computing device.

As discussed above, in some examples the method may also receive, through a network from another device, a request to provide the stored network address, and send the network address to the other device through the network. Also, in some examples, the method may also detect a new frame within the communication data, and the captured portion of the communication data may include a header of the new frame.

Figure 4:
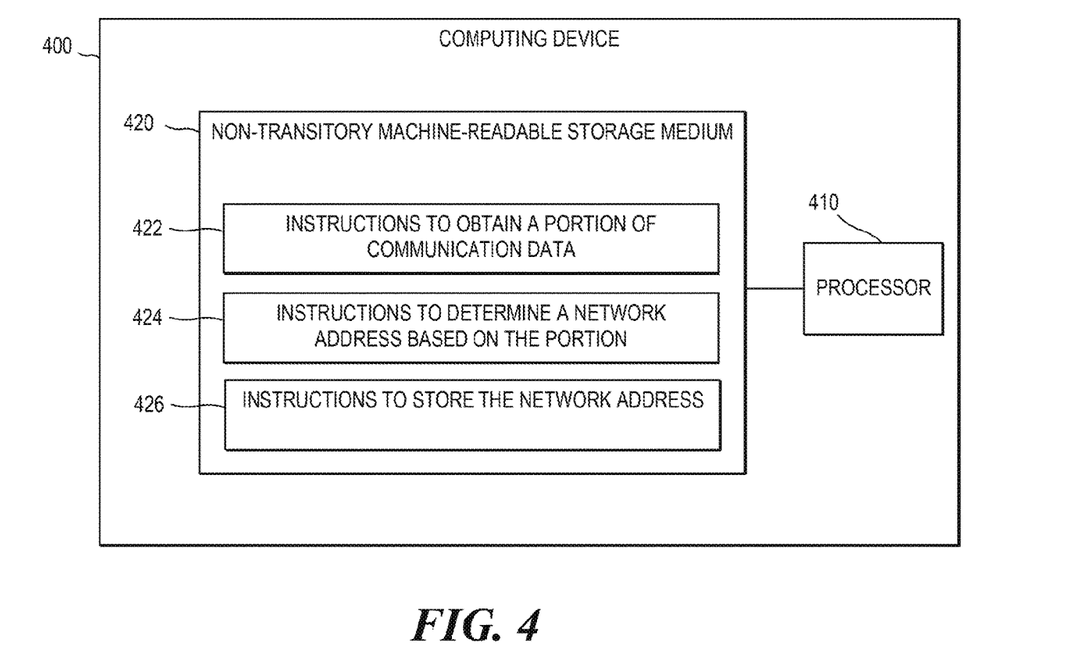
FIG. 4 is another block diagram of an example computing device.

FIG. 4 is a block diagram of an example computing device 400. Computing device 400 may be similar to computing device 100 of FIG. 1. In the example of FIG. 4, computing device 400 includes a processor 410 and a non-transitory machine-readable storage medium 420. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 410 may be similar to managing processor 110 of FIG. 1, and may include one or more central processing units (CPUs), microprocessors, and/or other hardware devices suitable for retrieval and execution of instructions stored in non-transitory machine-readable storage medium 420. In the particular example shown in FIG. 4, processor 410 may fetch, decode, and execute instructions 422, 624, 626, or any other instructions (not shown for brevity). As an alternative or in addition to retrieving and executing instructions, processor 410 may include one or more electronic circuits comprising a number of electronic components for performing the functionality of one or more of the instructions in machine-readable storage medium 420. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 420 may be similar to memory 160, and may include any electronic, magnetic, optical, or other physical storage device that stores executable instructions. Thus, medium 420 may be, for example, Random Access Memory (RAM), an Electrically-Erasable Programmable Read-Only Memory (EEPROM), a storage drive, an optical disc, and the like. Medium 420 may be disposed within computing device 400, as shown in FIG. 4. In this situation, the executable instructions may be "installed" on computing device 400. Alternatively, medium 420 may be a portable, external or remote storage medium, for example, that allows computing device 400 to download the instructions from the portable/external/remote storage medium. In this situation, the executable instructions may be part of an "installation package". As described herein, medium 420 may be encoded with executable instructions for generating report(s).

Referring to FIG. 4, instructions 422, when executed by a processor (e.g., 410), may cause the processor to obtain, from a communications monitor, a portion of communication data sent by a communications module (e.g., a MAC module or a PHY module). Instructions 424, when executed by a processor, may cause the processor to determine, based on the portion, a network address associated with a computing device comprising the communications module. Instructions 426, when executed by a processor, may cause the processor to store the network address in a memory coupled to the computing device.

The invention claimed is:

1. A computing device comprising:
   a first communications module to send communication data to a second communications module, wherein the first communications module is coupled to the second communications module via a bus comprising a plurality of signals;
   a communications monitor to capture a portion of the communication data sent from the first communication module to the second communications module, wherein the communications monitor is coupled to at least one of the plurality of signals of the bus between the first communications module and the second communications module; and
   a management processor to determine, based on the captured portion, a network address associated with the computing device, and communicate the network address to another computing device.

2. The computing device of claim 1, wherein the first communications module is coupled to the second communications module via a media-independent interface (MII) bus, the MII bus comprising at least four data transmission signals, and wherein the communications monitor is coupled to the four data transmission signals of the MII bus between the first communications module and the second communications module.

3. The computing device of claim 1, wherein the first communications module comprises a Media Access Control (MAC) module, and wherein the second communications module comprises a physical layer (PHY) module.

4. The computing device of claim 1, wherein the portion comprises at least one Ethernet frame.

5. The computing device of claim 1, wherein the network address comprises an Internet Protocol (IP) address assigned to the computing device, and wherein the management processor is further to determine whether the captured portion comprises the IP address.

6. The computing device of claim 5, wherein the IP address comprises one of an IPv4 address and an IPv6 address, and wherein the management processor is further to determine, based on the captured portion, whether the captured portion is associated with an IPv4 protocol or an IPv6 protocol.

7. The computing device of claim 1, wherein the computing device is accessible by the other computing device using the network address, wherein the management processor is associated with another network address, and wherein the management processor of the computing device is accessible by the other computing device using the other network address.

8. A method comprising:
monitoring, by a communications monitor, communication data transmitted between two communications modules of a computing device, wherein the two communications modules are coupled via a bus comprising a plurality of signals, and wherein the communications monitor is coupled to at least one of the plurality of signals of the bus between the two communications modules;
capturing a portion of the communication data;
determining, based on the communication data, a version of a protocol associated with the communication data;
based on the version, determining a location, within the portion, of a network address associated with the computing device; and
extracting the network address from the portion, and storing the network address in a memory of the computing device.

9. The method of claim 8, the method further comprising:
receiving, through a network from another device, a request to provide the stored network address; and
sending the network address to the other device through the network.

10. The method of claim 8, wherein the two communications modules of the computing device comprise a MAC module and a PHY module, wherein the communications monitor captures the communication data during transmission from the MAC module to the PHY module.

11. The method of claim 8, the method further comprising detecting a new frame within the communication data, wherein the captured portion of the communication data comprises a header of the new frame.

12. A non-transitory machine-readable storage medium encoded with instructions executable by a processor to:
obtain, from a communications monitor, a portion of communication data sent by a first communications module to a second communication module, wherein the first communications module is coupled to the second communications module via a bus comprising a plurality of signals, and wherein the communications monitor is coupled to at least one of the plurality of signals of the bus between the first communications module and the second communications module;
determine, based on the portion, a network address associated with a computing device comprising the first communications module, wherein the communications monitor and the second communication module are included in the computing device; and
store the network address in a memory coupled to the computing device.

13. The non-transitory machine-readable storage medium of claim 12, wherein the first communications module comprises a MAC module of the computing device.

14. The non-transitory machine-readable storage medium of claim 13, wherein the second communications module comprises a PHY module of the computing device.

15. The non-transitory machine-readable storage medium of claim 12, wherein the network address comprises an Internet Protocol (IP) address assigned to the computing device.

16. The non-transitory machine-readable storage medium of claim 15, wherein the computing device comprises a management processor to:
determine the IP address based on the portion, and
communicate the IP address to a second computing device.

17. The non-transitory machine-readable storage medium of claim 16, wherein the computing device is accessible by the second computing device using the IP address, wherein the management processor is associated with a second IP address, and wherein the management processor of the computing device is accessible by the second computing device using the second IP address.

18. The method of claim 9, wherein the network address comprises a first Internet Protocol (IP) address assigned to the computing device, the method comprising:
determining, by a management processor of the computing device, the first IP address based on the captured portion of the communication data; and
in response to the request from the other device, sending, by the management processor of the computing device, the first IP address to the other device.

19. The method of claim 18, wherein the computing device is accessible by the other device using the first IP address, wherein the management processor is associated with a second IP address, and wherein the management processor of the computing device is accessible by the other device using the second IP address.

* * * * *